Figure 1:
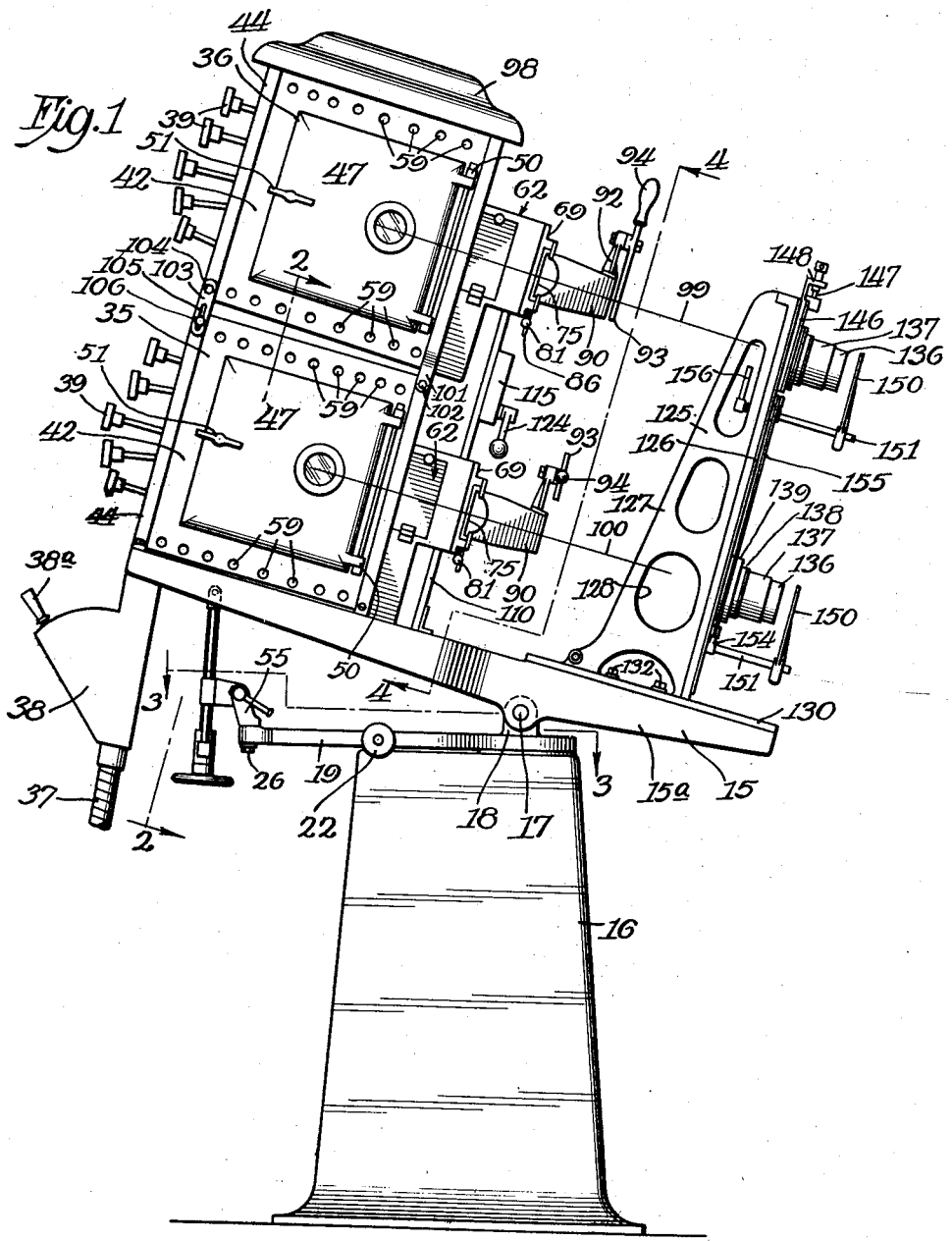

Dec. 20, 1932.  J. H. GOLDBERG  1,891,473
PICTURE PROJECTION MACHINE
Filed June 7, 1929   5 Sheets-Sheet 1

Inventor
Joseph H. Goldberg
By Rector, Hibben, Davis & Macauley, Attys.

Dec. 20, 1932.                J. H. GOLDBERG                1,891,473
                          PICTURE PROJECTION MACHINE
                         Filed June 7, 1929        5 Sheets-Sheet 2
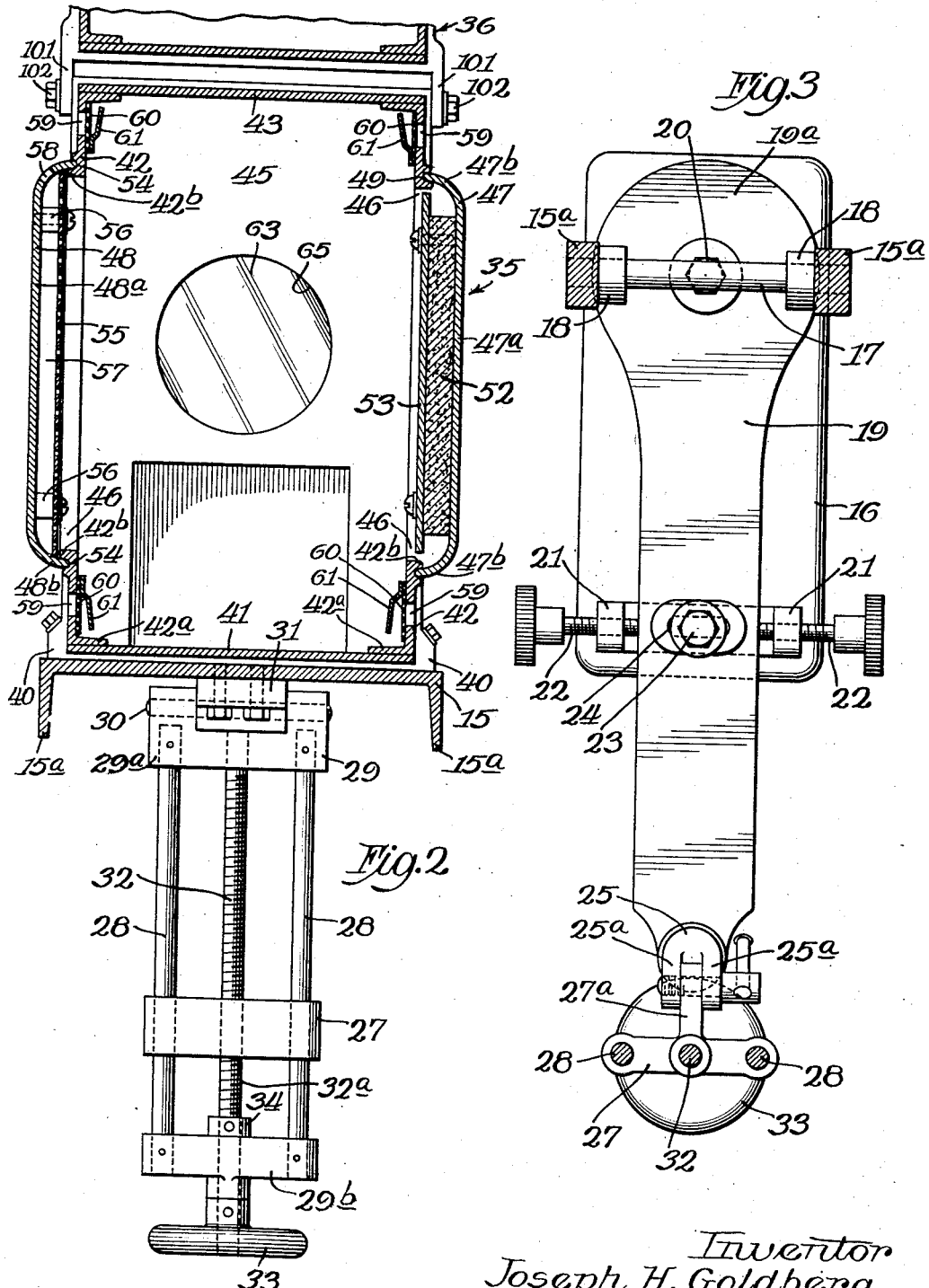

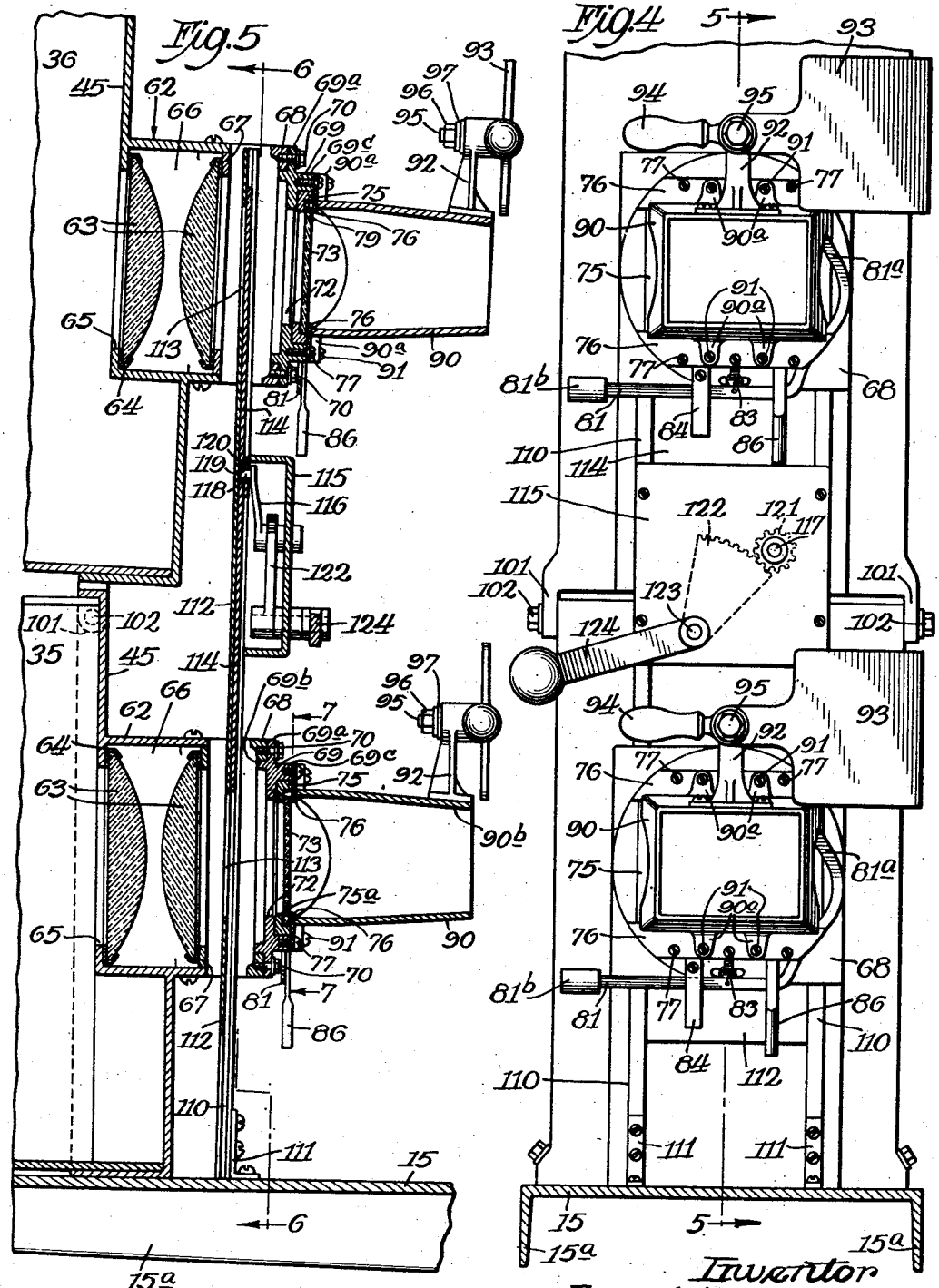

Dec. 20, 1932.  J. H. GOLDBERG  1,891,473
PICTURE PROJECTION MACHINE
Filed June 7, 1929  5 Sheets-Sheet 4
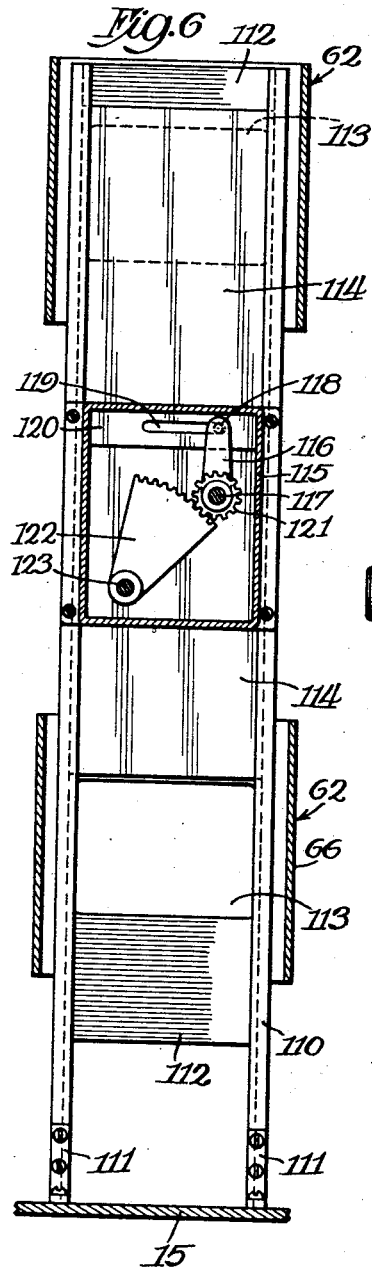
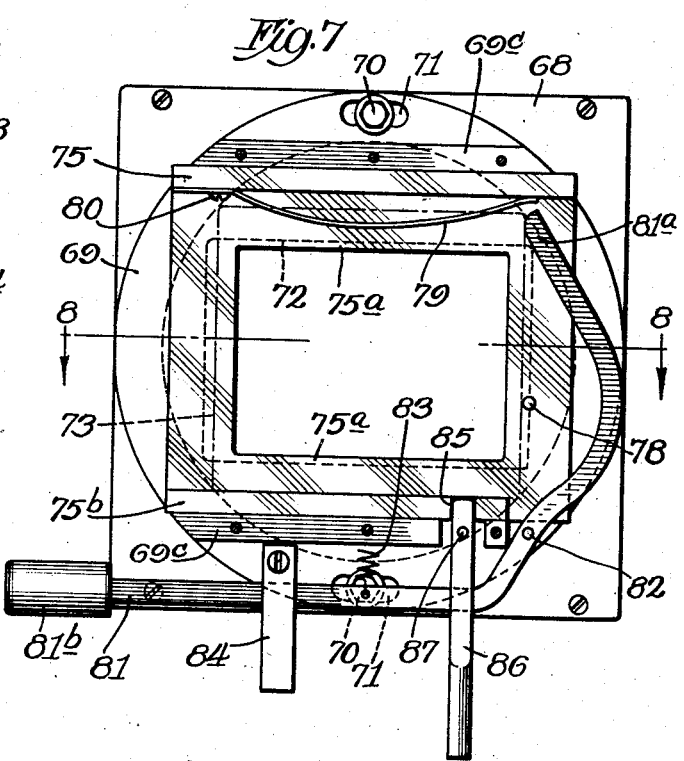
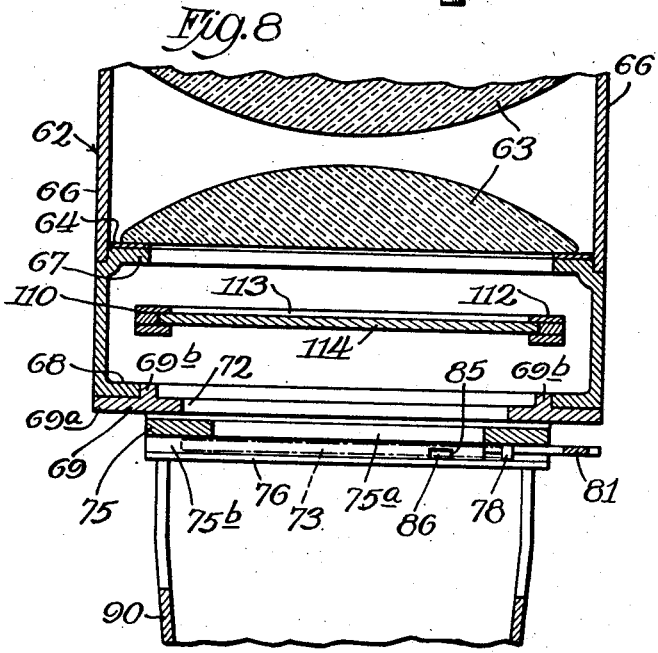
Inventor
Joseph H. Goldberg
By Rector, Hibben, Davis & Macauley, Attys.

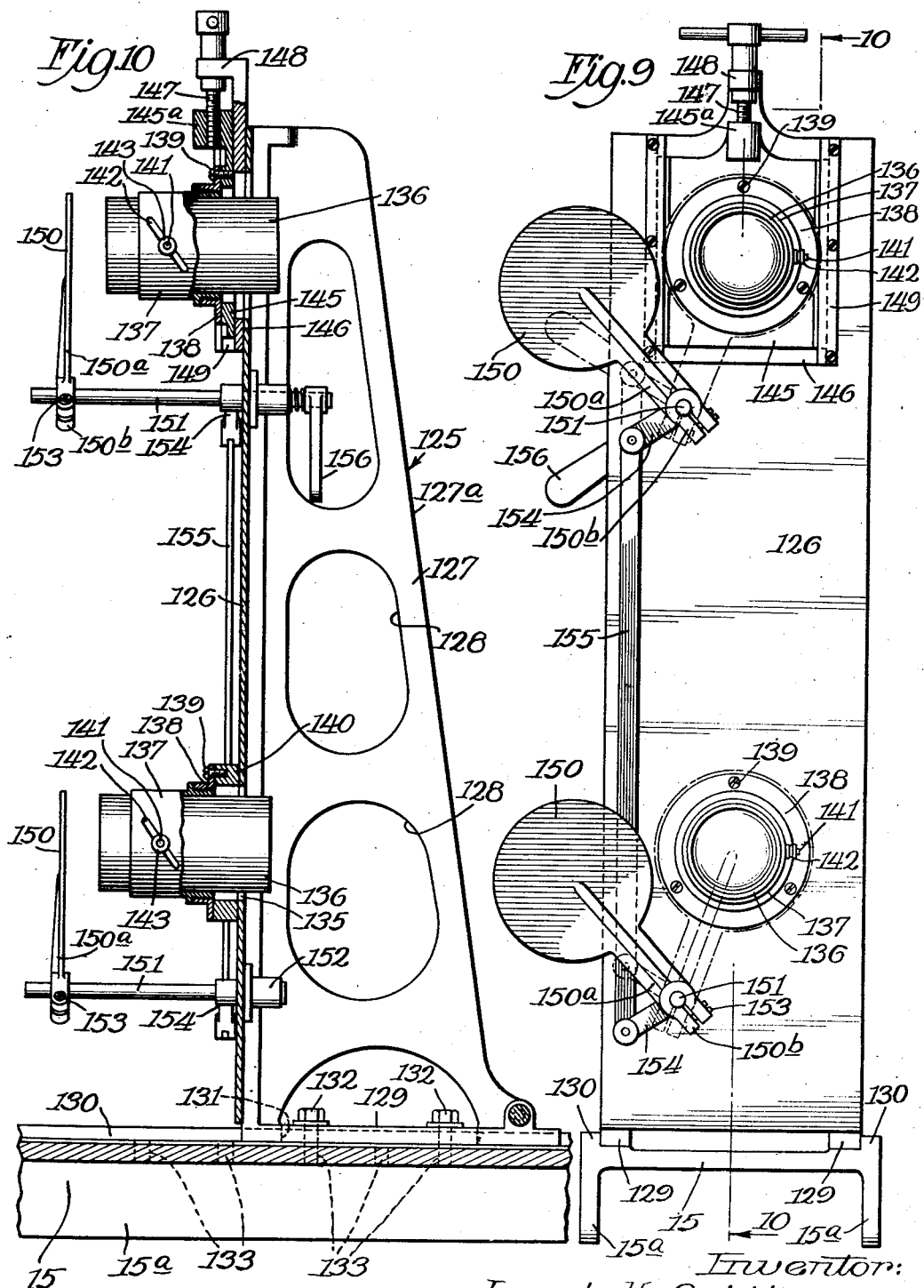

Patented Dec. 20, 1932

1,891,473

UNITED STATES PATENT OFFICE

JOSEPH H. GOLDBERG, OF CHICAGO, ILLINOIS, ASSIGNOR TO CHICAGO CINEMA EQUIPMENT COMPANY, OF CHICAGO, ILLINOIS, A CORPORATION OF ILLINOIS

PICTURE PROJECTION MACHINE

Application filed June 7, 1929. Serial No. 369,062.

This invention relates to picture projection machines and its purpose is to provide an improved apparatus adapted for use in motion picture theatres and the like for projecting pictures, diagrams, reading matter and the like upon a screen. The principal object of the invention is to provide a simple, compact and rugged machine having operating parts which are readily adjustable for the convenient manipulation of the operator in projecting slides upon a screen. Still another object is to provide a picture projection machine having improved means for effecting adjustment thereof with respect to its supporting base. Still another object is to provide an improved shutter mechanism for cutting off the light projected to the lenses of the machine. A further object is to provide means for effecting relative adjustment of two independently operating projection units so that the beams of light projected therefrom will be focused upon the screen. A further feature of the invention is the provision of an improved lens holder comprising improved means for effecting relative adjustment of the projection lenses. Other objects of the invention relate to various features of construction and arrangement which will appear more fully hereinafter.

The nature of the invention will be understood from the following specification taken with the accompanying drawings in which one embodiment is illustrated. In the drawings, Fig. 1 shows a side elevation of the improved picture projection machine; Fig. 2 shows a section taken on the line 2—2 of Fig. 1, looking in the direction of the arrows; Fig. 3 shows a horizontal section taken on the line 3—3 of Fig. 1, looking in the direction of the arrows; Fig. 4 shows a section taken on the line 4—4 of Fig. 1, illustrating in elevation the shutter mechanism mounted in front of the lamp housings and their lenses; Fig. 5 shows a vertical section taken on the line 5—5 of Fig. 4; Fig. 6 shows a section taken on the line 6—6 of Fig. 5, illustrating the operating parts of the shutter mechanism; Fig. 7 shows an enlarged front elevation of one of the slide carriers, looking toward the left as viewed in Fig. 1; Fig. 8 shows a section taken on the line 8—8 of Fig. 7; Fig. 9 shows a front elevation of the lens carrier or support and associated parts, looking toward the left as viewed in Fig. 1; and Fig. 10 shows a vertical section taken on the line 10—10 of Fig. 9.

As illustrated in the drawings, the principal parts of the picture projection apparatus are mounted on a table 15 which is adjustably supported on a stationary base 16 adapted to be secured to the floor or the like. The table 15 is provided on opposite sides with downwardly extending flanges $15^a$ which are engaged by a transverse shaft 17. This shaft is adapted to rotate in lugs 18 which project upwardly from an adjusting plate 19. This plate 19 is provided at one end with a circular portion $19^a$ centrally engaged by a bolt 20 which forms a vertical pivot extending downwardly into the base 16 so that the adjusting plate 19 and the table 15 carried thereby may be adjusted about a vertical axis. For the purpose of securing the plate 19 in its adjusted position, the base 16 is provided with a pair of upwardly extending lugs 21 which are located on opposite sides of the plate 19, as illustrated in Fig. 3, being engaged by adjusting screws 22, the ends of which contact with opposite sides of the plate 19 for securing it in the desired position. The plate 19 may also be securely clamped in position by means of a stud 23 which extends downwardly through the elongated aperture 24 in the plate and engages a threaded aperture in the base 16.

In addition to the adjustment of the table 15 laterally about a vertical pivot, which is permitted by the adjustment of the plate 19 in a lateral direction, the table 15 is also capable of being adjusted about the shaft 17 in a vertical plane. For this purpose, the end of the plate 19 which projects beyond the base 16 is provided with an upwardly extending connecting member 25 which is secured in place by the vertically extending bolt or stud 26. The member 25 is provided with a pair of ears $25^a$, as shown in Fig. 3, which extend on opposite sides of the arm $27^a$ of a bracket 27. This bracket is T-shaped in cross-section and the laterally projecting arms thereof are adapted to slide on the rods 28 of an adjusting frame 29 having at its upper end a transverse frame member 29$^a$ which is connected by a pivot pin 30 with a bracket 31 secured to the under side of the table 15. The rods 28 are united at their lower ends by the transverse frame member 29$^b$ and the two frame members 29$^a$ and 29$^b$ serve as journals for a rotatable adjusting screw 32 having at its lower end a handle 33. Collars 34 are secured on the screw 32 on opposite sides of the frame member 29$^b$ to maintain the adjusting screw against longitudinal displacement and the intermediate threaded portion 32$^a$ of the screw threadedly engages an aperture in the central part of the bracket member 27. It will be apparent that by turning the handle 33 the adjusting screw 32 will thereby raise or lower the frame 29 with respect to the bracket 27. By means of this combination of adjustments of the table 15, the light rays projected by the apparatus mounted on the table may be directed to any desired spot within a considerable range.

The table 15 carries at the rear end thereof a pair of lamp housings 35 and 36 which are mounted one above the other with the lower one 35 secured in fixed position on the table. These housings contain the usual arc lamps or other illuminating means which are suitable for picture projection purposes and the electric current for operating these lamps is provided through electric conductors 37 which lead into the switch casing 38 secured to the table 15 and projecting downwardly therefrom adjacent the adjusting frame 29, as shown in Fig. 1. The switch within the casing 38 is operated by a handle 38$^a$ and the lamps which are located within the housings 35 and 36 are operated and controlled by means of adjusting devices having handles 39 which project from the rear end walls of the casing. As shown particularly in Fig. 2, the lower housing 35 comprises a base plate 40 which is secured in fixed position on the table 15 and which has flanges extending upwardly on opposite sides of the housing. The bottom wall 41 of the housing is mounted within the base plate 40 and the metal side walls 42 extend upwardly from opposite sides of the bottom plate 41. The side walls 42 are provided at their upper and lower edges with inwardly directed flanges 42$^a$ which are connected to the lower wall 41 and also to the top wall 43. The side walls 42 are further united at their rear ends by the rear wall 44 of the housing and at their forward ends they are united by the forward wall 45. Thus there is provided a closed, fireproof metallic casing which is secured firmly in position on the table 15. For the purpose of gaining access to the interior of the housing, the side walls 42 are provided with openings 46, one of these openings being closed by a door 47 and the other opening being closed by a door 48. The door 47 comprises a metal plate having a body portion 47$^a$ with inwardly directed curved flanges 47$^b$ around the outer edges thereof. These flanges 47$^b$ engage a groove 49 in the side wall which extends completely around the adjacent opening 46 on the outer side of the outwardly directed flange 42$^b$ of the side wall, thus forming a tight closure throughout the periphery of the door. This door is hinged at its forward edge by a hinge 50, as shown in Fig. 1, and the other edge thereof is secured in position by means of a latch 51. A layer of asbestos or other suitable insulating material 52 is secured to the inner side of the plate 47$^a$, as shown in Fig. 2, and a plate of heat insulating material 53 is secured on the inner side of the material 52 to overlap the edges thereof, thus preventing the passage of heat from the interior of the lamp housing to that side of the housing upon which the operator is located.

The door 48 at the other side of the lamp housing 35 is made up of a metal plate 48$^a$ having inwardly directed flanges 48$^b$ around the outer edges thereof adapted to engage a groove 54 which extends around the door opening 46 in the adjacent side wall, this groove being located outwardly from the flange 42$^b$ of the wall. Since this door is located away from the operator of the machine, means are provided for effecting ventilation of the interior of the housing. For this purpose, the door has secured thereto an inner perforated lining member 55 which is spaced from the plate 48$^a$ and secured thereto by the members 56, thus providing an intervening air space 57 which communicates with the outer air through one or more openings 58 located in the upper part of the door plate. This door is also secured to the housing by hinges and maintained in closed position by a latch during the normal operation of the machine.

To provide additional ventilation for the interior of the lamp housing, the side walls 42 are provided along the upper and lower edges thereof with a plurality of apertures 59 through which air can pass from the interior of the housing through the perforated plates 60 which are secured over the openings. Deflectors 61 are secured to the inner side of each side wall 42 and extend over the perforated plate 60 opposite the apertures 59 to prevent the undue escape of light and heat from the interior of the housing.

The front wall 45 of the housing 35 has formed in an intermediate part thereof a lens casing 62 having mounted therein the condensing lenses 63 which are retained in place by the annular clips 64. The opposite walls of the lens casing are provided with apertures 65 through which the light is permitted to pass through the lenses and therefrom through the other parts of the picture projection apparatus provided for that purpose. The lens casing 62 has side walls 66 which project forwardly beyond the front wall 67 of this casing, as shown in Fig. 5, being united at their forward ends by a rectangular skeleton wall 68 which serves as a seat for a supporting plate 69 having an outwardly directed flange 69$^a$ which is secured to the wall 68 by screws 70 and which has an inwardly directed flange 69$^b$ extending within the opening of the skeleton wall 68. The screws 70 engage elongated slots 71 in the wall 68 and the flange 69$^b$ and the opening engaged thereby are circular in form so that by loosening the screw 70, the supporting plate 69 may be adjusted angularly in order that the walls of the rectangular opening 72 formed therein may be caused to extend in the desired direction. The light passing through the lenses 63 and through the opening 72 is adapted to pass through the slide 73 bearing the picture or other subject matter to be projected onto the screen and this slide is mounted in the rectangular frame or slide carrier 75 having inwardly projecting flanges 75$^a$ which overlap the edges of the slide and which define the opening through which the light shines. The slide carrier 75 is adjustable transversely of the machine between flanges 69$^c$ which are formed on the supporting plate 69 and the slide carrier is retained against displacement away from the lamp housing by plates 76 which are secured to the flanges 69$^c$ by screws 77 and which overlap the upper and lower edges of the slide carrier and also the upper and lower edges of the slide 73. As shown particularly in Fig. 7, the slide carrier is adapted to receive the slide 73 between its upper and lower flanges and the inward movement of the slide in the carrier is limited by an outwardly extending pin 78. The slide is maintained in engagement with the lower wall of the slide carrier by means of a leaf spring 79 which is secured to the upper wall of the slide carrier by a screw 80, the intermediate part of the spring being adapted to contact with the upper edge of the slide. When the operator desires to remove the slide from the carrier, this is accomplished by means of an ejecting arm or lever 81 which is pivoted at the point 82 on the plate 69 and which has an upwardly and inwardly curved extremity 81$^a$ adapted to engage the upper and innermost edge of the slide, as shown in Fig. 7. This ejecting lever has a handle 81$^b$ which, when depressed by the operator, causes the extremity 81$^a$ to move toward the left, as viewed in Fig. 7, thereby pushing the slide outwardly toward the operator from the slide carrier 72.

The ejecting lever 81 is normally maintained in the position shown in Fig. 7 by means of a coil spring 83 which is connected to the lever and to a stationary pin on the supporting plate 69 in the region between the handle and the pivotal point 82. The downward movement of the handle portion of the lever 81 is limited by a U-shaped guiding bracket 84 which is attached to the end wall 68 and which extends downwardly therefrom on opposite sides of the lever. For the purpose of effecting a precise adjustment of the slide carrier within the supporting frame 69, the lower outwardly projecting flange 75$^b$ of the slide carrier is provided with a notch 85 adapted to be engaged by the upper extremity of an adjusting lever 86 pivoted at the point 87 on the lower flange 69$^c$ of the supporting plate. By adjusting the lever 86 angularly, the slide carrier 75 may be adjusted within a limited range inwardly or outwardly with respect to the position of the operator.

Projecting outwardly from the slide carrier 75 are hollow light hoods 90 of rectangular cross-section, the walls of which converge slightly away from the lamp housing, as shown in Figs. 4 and 5, these hoods being provided with outwardly directed flanges 90$^a$ which are secured to the flanges 69$^c$ of the supporting plate by means of screws 91. The upper wall 90$^b$ of each light hood has secured thereto an upwardly projecting bracket 92 upon which is mounted a rectangular shutter 93 having a handle 94. The shutter is pivoted on the bracket 92 by means of a bolt 95 and a nut 96, spring washers 97 being interposed between the nut and the hub of the bracket so that the shutter 93 may be frictionally maintained in any desired position. When moved downwardly over the mouth of the light hood 90 it is adapted to prevent the passage of light rays therefrom.

The structure and apparatus which have been described above as forming a part of the lamp housing 35 and as being associated therewith are provided also as a part of, or in conjunction with, the upper lamp housing 36 and since these parts are identical in construction, the foregoing description will suffice for both. The upper lamp housing 36 differs from the lower one in that it has a top hood or cover 98 and also in the fact that, instead of being mounted in a stationary position, it is adjustable with respect to the lower lamp housing 35 for the purpose of varying the angle of the axis 99 of the light rays projected therefrom with respect to the axis 100 of the light rays projected from the lower lamp housing 35. This angular adjustment is permitted by flanges 101 which extend downwardly at the forward lower edges of the upper lamp housing 36 on opposite sides of the lower lamp housing 35, as shown in Figs. 1 and 4, these flanges being secured to the lower lamp housing by means of studs 102 which permit a tilting movement of the upper lamp housing. The rear end of the upper lamp housing 36 is connected to the lower lamp housing by means of plates 103 which are pivoted at 104 on the upper lamp housing and which are provided with elongated slots 105 engaged by the set screws 106 which engage threaded apertures in the side walls of the lower housing. By adjusting these set screws, the upper lamp housing may be varied in position to cause the axis 99 of the upper light beam to be so positioned with respect to the axis 100 of the lower light beam that the two light beams will be coincident on the screen when both are simultaneously in operation.

In addition to the separately controlled and individually operated shutters 93 which may be employed for preventing the passage of light rays from either the upper or the lower light housing when the lamps are in operation, there is provided additional shutter apparatus by which the closing or opening of the light opening of one lamp housing effects a simultaneous opposite action with respect to the light opening of the other housing so that by the operation of this shutter mechanism one light beam is automatically extinguished when the other one is turned on. This shutter apparatus is mounted on a shutter support 110 which extends vertically between the front wall 67 of the lens casing 62 and the walls 68 which are mounted at the forward ends of the side wall extension 66, as shown particularly in Fig. 5 and Fig. 8. The shutter support 110 is secured to the table 15 by means of a bracket 111 and it comprises a relatively thin vertical plate 112 provided with openings 113 opposite each set of lenses 63. The plate 112 is provided along its opposite vertical edges with channel-shaped guides in which the shutter plate 114 is arranged to slide. This shutter plate is of such length that when it is in its uppermost position it closes the upper opening 113 while leaving the lower opening 113 exposed, as illustrated in Fig. 5 and, when the shutter plate 114 is in its lower position it closes the lower opening 113 and leaves the upper opening exposed. This shutter plate is operated by mechanism located in a housing 115 which is secured to an intermediate part of the shutter support 110 and it comprises an operating arm 116 secured on a shaft 117 which is journaled in the outer wall of the housing 115, the end of the arm 116 carrying a pin 118 which engages a slot 119 formed in the reinforcing plate 120 attached to the front side of the shutter plate. A pinion 121 is fixed on the shaft 117 and meshes with a geared sector 122 which is fixed on the operating shaft 123 also journaled in a bearing carried by the outer wall of the housing 115. This shaft 123 has a handle 124 fixed on the outer end thereof for engagement by the hand of the operator and, by rocking this handle, the shutter plate 114 may be quickly moved from one extreme position to the other for the purpose of simultaneously opening one of the light openings and closing the other, which operation is performed when the operator desires to discontinue the projection of the subject matter on one slide and to begin the projection of the subject matter on another slide which is positioned opposite the light opening of the other lamp housing. In this way, the two light projection units are employed alternately to maintain a succession of exposures on the screen of the subject matter contained on a series of slides.

At the forward end of the table 15 there is mounted a lens carrying frame 125 comprising a vertical transverse plate 126 and two connected side frames 127 having their rear edges 127ª upwardly and forwardly inclined and being provided with elongated openings 128 formed therein. The front wall 126 and the side walls 127 of the frame 125 are united at their lower ends by the bottom plate 129 which is adapted to seat on the table 15 between the upwardly directed flanges or ribs 130, as shown in Fig. 9. This bottom plate is provided with an elongated slot 131 which is engaged by screws or bolts 132 adapted to engage any selected pair of apertures 133 which are formed in the top wall of the table. The elongated slots 131 permit a considerable adjustment of the frame 125 longitudinally of the table and greater degrees of adjustment are permitted by selecting different pairs of holes 133 for engagement by the bolts 132.

The vertical plate 126 of the lens carrying frame 125 is provided toward the lower part thereof with a circular aperture 135 which is engaged by the tubular lens carrier 136 having mounted therein the projecting lenses for the lower light beam, the axis of the carrier 136 being coincident with the axis 100 of the lower light beam. The lens carrier 136 is mounted in a tubular cylindrical support 137 which threadedly engages a collar 138 secured by the screws 139 to a ring 140 attached to the frame member 126. The lens carrier 136 is provided on one side with a threaded stud which projects through an inclined slot 142 formed in the cylindrical support 137 and the end of this stud is engaged by a knurled nut 143 which may be adjusted to secure the carrier 136 in the desired position.

Adjacent the upper part of the frame 125 there is provided another similar lens carrier 136 mounted in a cylindrical support 137 and secured in adjusted position by means of a stud 141 and nut 142, these parts and the mounting thereof being like that previously described, but the upper lens carrier 136 is mounted at an inclination to the axis of the lower lens carrier 136, instead of parallel thereto, so that the axis of the upper lens carrier may coincide with the axis of the upper light beam 99 which, as previously described, converges downwardly toward the axis 100 of the lower light beam. To effect this result, the collar 138 of the upper lens carrier 136 is secured to an adjustable plate 145 adapted to slide on the surface of a tapered plate 146 which is secured to the upper part of the frame member 126 and which has its forward surface inclined to the surface of the plate or frame member 126 in order to effect a corresponding downward inclination of the axis of the upper lens carrier 136. The adjustable plate 145 is provided at its upper end with a transverse lug 145ª engaged by an adjusting screw 147 which is adapted to rotate in a bearing formed in the flange 148 projecting laterally from the plate 146. By rotating the screw 147, the upper lens carrier 136 may be adjusted vertically until its axis coincides with the axis 99 of the upper light beam. The plate 145 slides in guideways 149 which are carried by the lateral edges of the plate 146, as shown in Fig. 9. By adjusting the frame 125 on the table and thereby effecting relative angular and longitudinal adjustment of the lens holders 136 with respect to the frame and with respect to each other, it is possible to obtain the desired focus of the lenses and to secure an identical location of the pictures projected through the two lens carriers upon the screen.

The frame 125 which serves as a support for the lens carriers 136 also carries a pair of circular shutters 150, each of which is adapted to be moved into position opposite the mouth of one of the lens carriers 136. Each shutter 150 is provided with an arm 150ª which is bifurcated at its extremity, as shown at 150ᵇ to engage a shaft 151. These shafts are journaled in bearings 152 carried by the plate 126 of the upwardly extending frame 125 and the shutters are secured in the desired angular positions on these shafts by means of the clamping screws 153 which engage the bifurcated arms 150ᵇ. Each shaft 151 has a crank arm 154 secured thereon and these crank arms are connected by a rod 155 which is pivotally attached to each crank arm so that both shutters may be operated simultaneously by means of a handle 156 which is formed as a continuation of one of the crank arms. As shown in Figs. 9 and 10, the shutters 150 are mounted on the shaft 151 so that the shutters are operated simultaneously to close the openings of the lens carriers or to reveal said openings and permit the passage of the light beams therethrough. Of course, the shutters may be arranged angularly on the shaft to effect the alternate operation thereof if desired.

Although one form of the invention has been shown and described by way of illustration it will be understood that it may be embodied in various other forms within the scope of the appended claims.

I claim:

1. In apparatus of the class described, a lamp housing having means for projecting a beam of light, a screen support mounted in front of said lamp housing, a screen slidable in said support, said screen being provided with a slot, a pivoted arm having a pin engaging said slot, a pinion for turning said arm, a rack engaging said pinion, and means for operating said rack.

2. In apparatus of the class described, a lamp housing having a lens casing formed in the forward wall thereof, lenses mounted in said casing, the side walls of said casing having forward extensions, an end plate mounted on said forward extensions and having a light opening therein, a vertical screen support extending between said forward extensions inwardly of said end wall, and a screen slidable in said support.

3. In apparatus of the class described, a lamp housing having a lens casing formed in the forward wall thereof, lenses mounted in said casing, the side walls of said casing having forward extensions, an end plate mounted on said forward extensions and having a light opening therein, a vertical screen support extending between said forward extensions inwardly of said end wall, a screen slidable in said support, a slide carrier movably mounted in said end wall, and means for adjusting the position of said slide carrier.

4. In apparatus of the class described, picture projection apparatus comprising a housing having an opening through which light is projected, a supporting plate mounted around said opening, a slide carrier slidably mounted on said supporting plate, said slide carrier having a notch therein, and a pivotally mounted lever having a part engaging said notch to effect the adjustment of said slide carrier on said plate.

In testimony whereof, I have subscribed my name.

JOSEPH H. GOLDBERG.